United States Patent [19]

Autrey et al.

[11] E Patent Number: Re. 32,420

[45] Reissued Date of Patent: May 19, 1987

[54] WATERBED MATTRESS CONSTRUCTION

[75] Inventors: Robert C. Autrey, San Jose; John W. Connolly, Pleasanton, both of Calif.

[73] Assignee: Morning Surf Corporation, Salt Lake City, Utah

[21] Appl. No.: 393,729

[22] Filed: Jun. 30, 1982

Related U.S. Patent Documents

Reissue of:

[64] Patent No.: 4,062,077
Issued: Dec. 13, 1977
Appl. No.: 759,381
Filed: Jan. 14, 1977

[51] Int. Cl.[4] ..... A47C 27/08

[52] U.S. Cl. ..... 5/451

[58] Field of Search ..... 5/451, 449, 450, 452–458, 5/422

[56] References Cited

U.S. PATENT DOCUMENTS

| | | | |
|---|---|---|---|
| 1,371,362 | 3/1921 | Giese . | |
| 3,308,491 | 3/1967 | Spence | 5/451 |
| 3,456,270 | 7/1969 | Weinstein et al. | 5/451 |
| 3,581,322 | 6/1971 | Marsico | 5/470 |
| 3,585,356 | 6/1971 | Hall | 5/451 |
| 3,689,949 | 9/1972 | Weinstein et al. | 5/451 |
| 3,702,484 | 11/1972 | Tobinick et al. | 5/451 |
| 3,728,747 | 4/1973 | Docker . | |
| 3,735,432 | 5/1973 | Kreten et al. | 5/451 |
| 3,736,604 | 6/1973 | Carson, Jr. | 5/451 |
| 3,742,531 | 7/1973 | Alsbury et al. | 5/451 |
| 3,778,852 | 12/1973 | Penn et al. | 5/452 |
| 3,787,908 | 1/1974 | Beck et al. | 5/451 |
| 3,789,442 | 2/1974 | Tobinick | 5/451 |
| 3,815,165 | 6/1974 | Tobinick et al. | 5/451 |
| 3,840,921 | 10/1974 | Labianco | 5/451 |
| 3,849,814 | 11/1974 | Ross | 5/422 |
| 3,864,767 | 2/1975 | Adams | 5/449 |
| 3,864,768 | 2/1975 | Fraige et al. | 5/452 |
| 3,958,286 | 5/1976 | Rodinsky | 5/451 |
| 4,015,299 | 4/1977 | Tinnel | 5/451 |
| 4,042,986 | 8/1977 | Goodman et al. | 5/500 |

*Primary Examiner*—Alexander Grosz
*Attorney, Agent, or Firm*—Flehr, Hohbach, Test, Albritton & Herbert

[57] ABSTRACT

Waterbed mattress construction having the size and appearance of a conventional innerspring mattress. An inner water mattress is supported laterally by a circumscribing framework, and an outer shell is removably mounted over the framework. The shell comprises a peripheral cushion and a padded covering which is tailored to have the appearance of a conventional mattress.

24 Claims, 2 Drawing Figures

WATERBED MATTRESS CONSTRUCTION

Matter enclosed in heavy brackets [ ] appears in the original patent but forms no part of this reissue specification; matter printed in italics indicates the additions made by reissue.

BACKGROUND OF THE INVENTION

This invention pertains generally to beds and mattresses and more particularly to a bed of the type having a water filled mattress.

Although waterbeds have enjoyed a widespread popularity in recent years, the waterbeds heretofore provided have had certain limitations and disadvantages. For example, the weight of the water makes such beds unsafe for use in some older buildings, and once filled the beds cannot be moved for cleaning or furniture rearranging without draining the water.

Prior waterbeds have not been totally compatible with existing furnishings. The relatively large wooden frame which surrounds most waterbeds makes such beds larger than conventional beds of equivalent size, and the frame is uncomfortable to sit on and difficult to climb over in getting into or out of the bed. Largely because of the weight of the water and the problem of supporting this weight, waterbeds have generally been placed directly upon the floor or on a relatively low platform or base, which makes them even more difficult to use.

SUMMARY AND OBJECTS OF THE INVENTION

The invention provides a waterbed mattress construction having the size and appearance of a conventional innerspring mattress. The mattress includes an inner bladder filled with water and supported laterally by a circumscribing framework. An outer shell is removably mounted over the bladder and framework and includes a resilient cushion which extends along the top and outer sides of the framework and a flexible cover which extends over the cushion and the water mattress. The cover is secured to the cushion and tailored to have the appearance of a conventional mattress.

It is in general an object of the invention to provide a new and improved waterbed mattress construction.

Another object of the invention is to provide a waterbed mattress construction of the above character having the size and appearance of a conventional innerspring mattress.

Additional objects and features of the invention will be apparent from the following description in which the preferred embodiment is set forth in conjunction with the accompanying drawings.

DESCRIPTION OF THE PREFERRED EMBODIMENT

Figure 1:
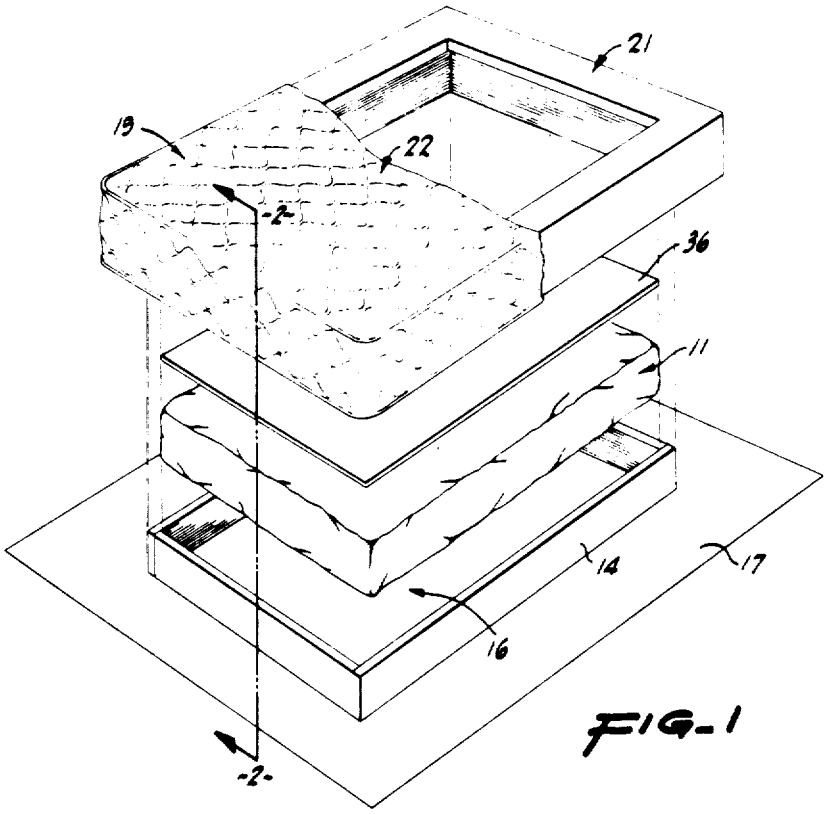
FIG. 1 is an exploded perspective view, partly broken away, of one embodiment of a mattress construction incorporating the invention.

The mattress construction includes a water mattress 11 comprising a flexible bladder 12 enclosing a body of water 13. A rigid circumscribing framework 14 defines a cavity 16 for the mattress and provides lateral support for the body of water. The framework is fabricated of a suitable material such as wood and, as illustrated, is open at the bottom. A flexible safety liner 17 extends across the open bottom and is folded up along the outer sides of the framework. The liner extends across the tops of the frame members and is secured to the inside of the frame by suitable means such as stapling. In the preferred embodiment, the bladder is fabricated of a 22 mil vinyl, and the liner is fabricated of a 12 mil vinyl.

An outer shell 19 is removably mounted on the framework and mattress. This shell comprises a peripheral cushion 21 and a flexible cover 22. The cushion is fabricated of four lengths 23 of polyurethane foam joined together to form a rectangular frame of slightly larger dimension than framework 14. Additional pieces of foam 24 are affixed along the upper inside edges of lengths 23 and overlie the framework. In the preferred embodiment, the foam of which cushion 21 is fabricated is a 1.8 pound polyurethane foam having an ILD (indent load deflection) number on the order of 50–80.

Figure 2:
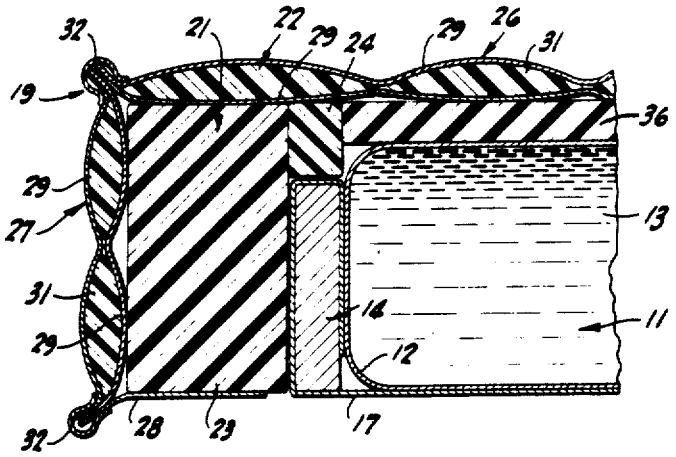
FIG. 2 is an enlarged, fragmentary cross-sectional view taken along line 22 of FIG. 1.

As illustrated in FIG. 2, cover 22 includes a top panel 26 which extends over the tops of the water mattress and cushion, a side panel 27 which extends along the outer side of the cushion, and a bottom panel 28 which extends along the underside of the cushion. The top and side panels include superposed sheets 29 of fabric and an intermediate layer of padding 31 which, in the preferred embodiment, is a one pound polyurethane foam having an ILD number of 10–12. The materials forming the top and side panels are sewed together in a quilted pattern to give the mattress the appearance of a conventional innerspring mattress, and the side panel is joined to the top and bottom panels by binding tape 32 and stitching (not shown) along the upper and lower side edges of the cushion. The bottom panel is secured to the lower side of the cushion, and in the embodiment illustrated, this panel comprises a single sheet of fabric, although it can also be of quilted construction, if desired.

An insulative pad 36 extends over the top of the water mattress below cover 22. In the embodiment illustrated, this pad is fabricated of a 1.2 pound polyurethane foam having an ILD number on the order of 30–36, and the upper surface of the pad is generally level with the top of cushion 21.

As indicated above, the mattress construction has the size and appearance of a conventional innerspring mattress. A twin size mattress might, for example, be 75 inches long, 39 inches wide, and 8 inches thick. For such a mattress, framework 14 can be constructed of $1 \times 5$ inch lumber, and cushion members 21 would be on the order of 7 inches high and 4 inches wide, with the pieces 24 which overhang the frame being on the order of 1 inch wide and 2 inches high. Water mattress 13 would be on the order of 5–6 inches high, and insulating pad 36 would be on the order of 1 inch thick. The foam padding in the top and side panels of the cover is preferably on the order of 3/16 to 1 inch in thickness.

In use, the mattress is placed on a suitable support such as a solid box foundation of conventional design. Such a foundation includes a plurality of horizontally extending wooden slats which support the mattress and can be provided with a covering which matches cover 22. The foundation can rest upon a metal frame or other conventional bed frame having a headboard and/or foot board.

The mattress is installed by stapling liner 17 to framework 14 and placing the assembled framework on the foundation. Bladder 12 is placed in cavity 16 and filled with water, following which pad 36 is placed over the water mattress and outer shell 19 is placed over the mattress and frame. If the water mattress should ever require repair or adjustment, the outer shell and insulative pad are easily removed to permit access to the water mattress and frame.

While the mattress construction has the size and appearance of a conventional innerspring mattress, it also has the advantages of a waterbed. The support provided by the mattress is a combination of flotation on the body of water and the hammock-like effect of cover 19. Cushion 21 provides relatively firm, comfortable seating at the periphery of the mattress and results in a waterbed which is easy to get onto and off of. The padding above frame 14 makes the rigid frame substantially imperceptible to a person resting toward the edge of the mattress. Insulative pad 36 and cover 19 provide thermal insulation and make it unnecessary to heat the water in the bladder. In addition, these pads provide additional support which tends to prevent "bottoming out" when a person suddenly shifts his weight on the mattress.

The invention has a number of important features and advantages. Having the size and appearance of a conventional mattress, the water bed mattress can be utilized with traditional furnishings and in circumstances where prior waterbeds could not be used. The mattress weighs substantially less than a conventional waterbed, and when mounted on a conventional metal frame with rollers, it can be moved for cleaning or rearranging of furniture. The outer shell remains neatly tailored, and the mattress can be used with standard size linens and blankets, including fitted sheets.

It is apparent from the foregoing that a new and improved waterbed mattress construction has been provided. While only one presently preferred embodiment has been described in detail, as will be apparent to those familiar with the art, certain changes and modifications can be made without departing from the scope of the invention as defined by the following claims.

What is claimed is:

1. In a mattress construction: a water mattress comprising a flexible bladder for holding a body of water, as rigid circumscribing framework defining a cavity for the mattress and providing lateral support of the body of water in the mattress, and an outer shell overlying the framework and cavity, said outer shell comprising a cushion of resilient padding extending along the top and outer sides of the framework and a flexible cover secured to the cushion and overlying the cavity and the top and outer sides of the cushion.

2. The mattress construction of claim 1 wherein the outer shell is removably mounted on the framework.

3. The mattress construction of claim 1 further including an insulative pad extending over the water mattress.

4. The mattress construction of claim 1 wherein the framework is open at the bottom and a water impervious liner extends over the outer sides and across the open bottom of the framework.

5. The mattress construction of claim 1 wherein the flexible cover is tailored to give the mattress construction the appearance of a conventional innerspring mattress.

6. The mattress construction of claim 1 wherein the flexible cover comprises two superposed sheets of fabric and a layer of insulative padding between the sheets, said sheets and layer being sewed together in a quilted pattern.

7. In a mattress construction: a water mattress, a rigid circumscribing framework exteriorly engaging the water mattress to provide lateral support for the water therein, said framework including a water impervious, flexible liner extending along the sides of the framework and beneath the water mattress, an insulative pad overlying the water mattress, a cushion of resilient padding extending along the top and outer sides of the framework, the upper surface of the cushion being generally level with the upper surface of the insulative pad, and a flexible cover comprising a top panel having two superposed sheets of fabric and an intermediate layer of insulative padding extending over the upper surfaces of the insulative pad and cushion, a side panel extending along the outer side of the cushion, and a bottom panel secured to the under side of the cushion, the side panel being joined to the top and bottom panels by binding tape and stitching along the upper and lower side edges of the cushion.

8. The mattress construction of claim 7 wherein the cushion and flexible cover are removable as a unitary structure from the framework and water mattress.

9. The mattress construction of claim 7 wherein the sheets of fabric and layer of padding forming the top panel of the cover are stitched together in a quilted pattern.

[10. In a mattress construction: a water mattress, a rigid circumscribing framework providing lateral support for the water mattress, a cushion extending along the upper and outer sides of the framework, said cushion being of sufficient thickness above the framework to make the framework substantially imperceptible to a person sitting or lying on the lateral margins of the mattress, and a flexible cover overlying the cushion and the water mattress.]

[11. The mattress construction of claim 10 wherein the cover is secured to the cushion and the cover and cushion are removable as a unit from the framework and water mattress.]

[12. The mattress construction of claim 10 further including an insulative pad extending over the water mattress.]

[13. The mattress construction of claim 10 wherein the framework is open at the bottom and a water impervious liner extends over the outer sides and across the open bottom of the framework.]

[14. The mattress construction of claim 10 wherein the flexible cover is tailored to give the mattress construction the appearance of a conventional innerspring mattress.]

[15. The mattress construction of claim 10 wherein the flexible cover comprises two superposed sheets of fabric and a layer of insulative padding between the sheets, said sheets and layer being sewed together in a quilted pattern.]

[16. The mattress construction of claim 10 wherein the flexible cover comprises a top panel which extends over the tops of the water mattress and cushion, a side panel which extends along the outer side of the cushion, and a bottom panel which extends along the underside of the cushion, the side panel being joined to the top and bottom panels by binding tape and stitching along the upper and lower side edges of the cushion.]

17. In a mattress construction: a water mattress comprising a flexible bladder for holding a body of water, a rigid circumscribing framework defining a cavity for the mattress and providing lateral support for the body of water in the mattress, a cushion of resilient padding extending along the top and outer sides of the framework, and a flexible cover comprising a top panel which overlies the mattress cavity and cushion, a side panel which extends along the outer side of the cushion and a bottom panel which extends along the underside of the cushion, the side panel being joined to the top and bottom panels by binding tape and stitching along the upper and lower side edges of the cushion, *and the cushion and the cover being removable from the framework and the mattress.*

*18. In a mattress construction: a water mattress, a rigid circumscribing framework providing lateral support for the water mattress, a cushion extending along the upper and outer sides of the framework, said cushion being of sufficient thickness above the framework to make the framework substantially imperceptible to a person sitting or lying on the lateral margins of the mattress, and a flexible cover overlying the cushion and the water mattress, said cover and said cushion being removable from the framework and the water mattress.*

*19. The mattress construction of claim 18 wherein the cover is secured to the cushion and the cover and cushion are removable as a unit from the framework and water mattress.*

*20. The mattress construction of claim 18 further including an insulative pad extending over the water mattress.*

*21. The mattress construction of claim 18 wherein the framework is open at the bottom and a water impervious liner extends over the outer sides and across the open bottom of the framework.*

*22. The mattress construction of claim 18 wherein the flexible cover is tailored to give the mattress construction the appearance of a conventional innerspring mattress.*

*23. The mattress construction of claim 18 wherein the flexible cover comprises two superposed sheets of fabric and a layer of insulative padding between the sheets, said sheets and layer being sewed together in a quilted pattern.*

*24. The mattress construction of claim 18 wherein the flexible cover comprises a top panel which extends over the tops of the water mattress and cushion, a side panel which extends along the outer side of the cushion, and a bottom panel which extends along the underside of the cushion, the side panel being joined to the top and bottom panels by binding tape and stitching along the upper and lower side edges of the cushion.*

* * * * *